UNITED STATES PATENT OFFICE.

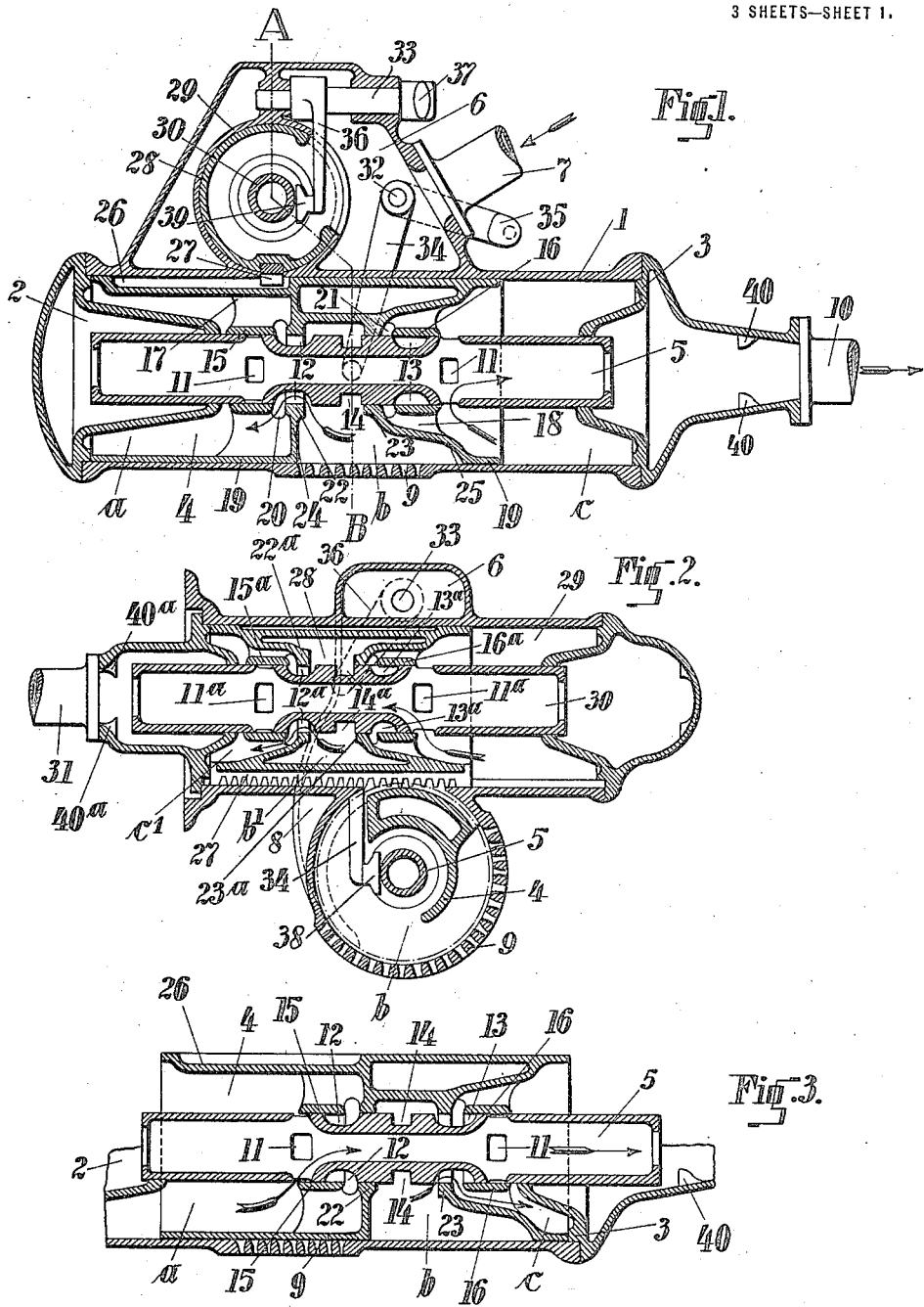

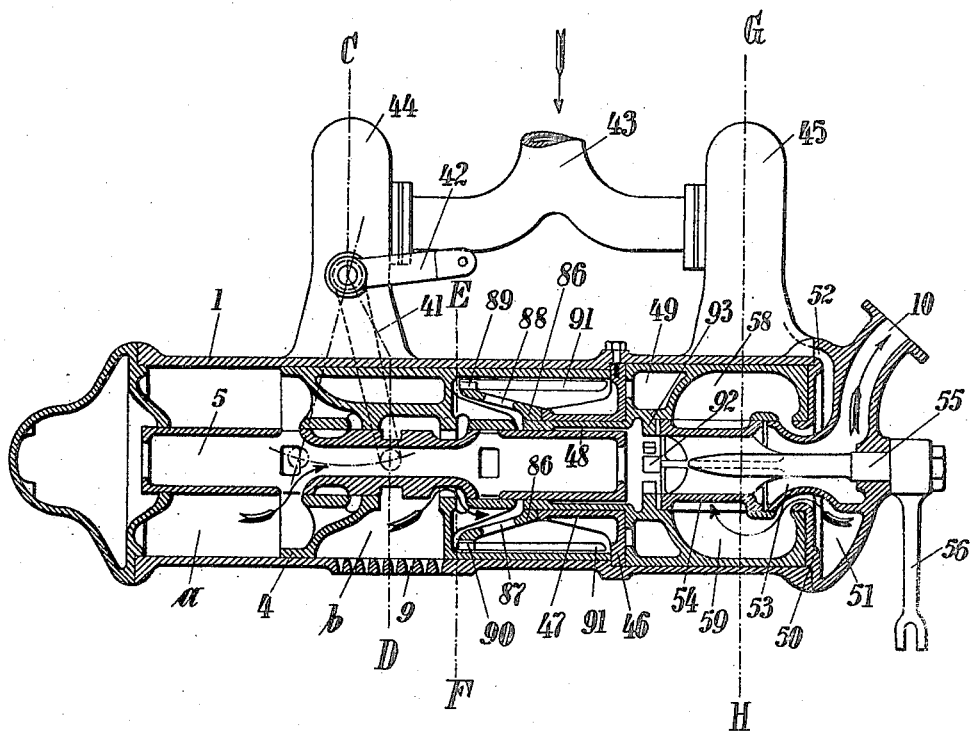

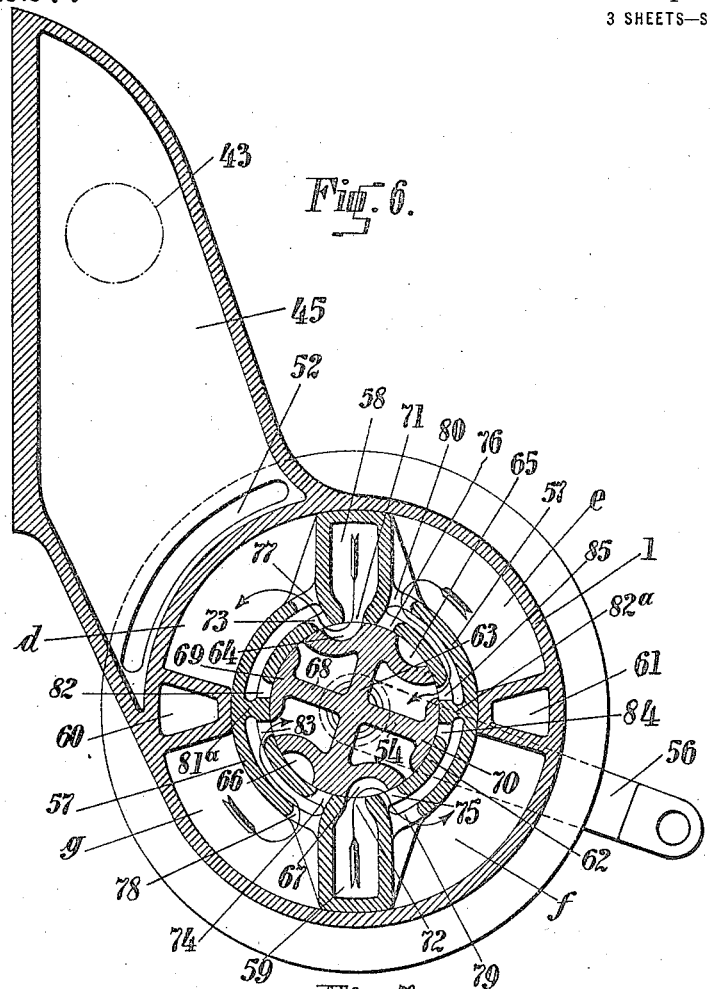
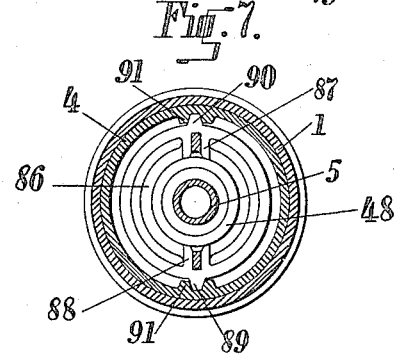

GUSTAV SCHLATTER, OF STEINACH, AND GUSTAV SEGIN, OF ARBON, SWITZERLAND, ASSIGNORS TO FIRMA ADOLPHE SAURER, OF ARBON, SWITZERLAND.

REGULATING DEVICE FOR WATERING-CARTS AND THE LIKE.

1,302,227.

Specification of Letters Patent.

Patented Apr. 29, 1919.

Application filed April 13, 1917. Serial No. 161,875.

*To all whom it may concern:*

Be it known that we, GUSTAV SCHLATTER, residing at Steinach, Switzerland, Villa Ceranique, Rorschacherstrasse 1, and GUSTAV SEGIN, residing at Arbon, Switzerland, Rebenstrasse 41, have invented a new and useful Regulating Device for Watering-Carts and the like, of which the following is a specification.

This invention relates to a regulating device for watering carts and the like, which comprises a regulating piston mounted to turn and to move lengthwise in the spraying head and operated by the pressure of water, and a hand operated control piston which brings about the longitudinal movement of the regulating piston controlling the length of the spray. The width of the spray is set by turning the regulating piston, and this turning movement also is brought about by the pressure of water. To that end we provide another hand operated device which turns the regulating piston. The operation of the regulating piston by the water pressure is advantageous as compared with direct hand operation, because the movements of the regulating piston take place more quickly.

Two constructions according to the invention are illustrated by way of example in the accompanying drawing.

Figure 1 shows in longitudinal section, and

Fig. 2 in cross-section on line A—B of Fig. 1, one construction,

Fig. 3 illustrates one of the positions of its regulating and control pistons,

Figure 4 is a longitudinal section of the other construction,

Fig. 5 a section on line C—D,

Fig. 6 a section on line G—H and

Fig. 7 a section on line E—F of Fig. 4, on an enlarged scale.

In the spraying head 1 closed at both ends by covers 2 and 3, are mounted two pistons or valves, the regulating piston 4 and the control piston 5 which is fitted into the first-named piston and guided with a tight joint in the covers 2 and 3. Longitudinal movement of the regulating piston determines the density of the spray, and its rotation the width of the spray. Water is supplied to a casing 6 cast on the spraying head, through a pipe 7, and passes through a conduit 8 adjoining the casing, into the spraying head. The spraying head is provided with a number of spraying holes 9 and connected at one end to a water discharge pipe 10 mounted on a branch cast on the cover 3. This pipe may be a return pipe leading to the source or reservoir (not shown) from which the pipe 7 is supplied with water.

The control piston 5 is hollow and open at both ends. In the center it is provided, symmetrically to its longitudinal axis, with two sets of slots 11, two recesses 12 and 13 and a groove 14 arranged in the center. The regulating piston 4 is formed with a cylindrical guide portion, in which the control piston is working, and the ends of this guide portion are provided with rings 15 and 16 connected by ribs 17 and 18 respectively to the outer cylindrical casing 19 of the regulating piston. At the inner sides of the rings are provided slots 20 and 21 bounded by annular bridges 22 and 23. The bridges 22 and 23 are also connected to the outer casing of the regulating piston by partitions 24 and 25 respectively. The regulating piston forms above the spraying holes 9 a chamber $b$ closed at one side by the flat wall or partition 24 adjoining the bridge 22, and at the other side by the curved wall or partition 25 adjoining the bridge 23. This chamber is in permanent communication with the water supply through the conduit 8. At the left hand side of the chamber $b$, the regulating piston forms with the casing a chamber $a$, at the right hand side a chamber $c$. Water from the casing 6 passes through the conduit 8 into the chamber $b$, and escapes through the spraying holes 9.

One end of the regulating piston 4 is provided, on a portion of its circumference, with teeth 26 of a width somewhat greater than the length of stroke of the regulating piston. With these teeth engages a rack 27 guided in the casing 6 and secured to a second regulating piston or slide valve 28. The construction of the latter is identical with that of the first regulating piston 4, and it is intended to turn the latter. The said piston or valve 28 is mounted to slide lengthwise in a cylindrical sleeve 29 rigid or integral with the casing 6 and operated by means of a control piston 30 similar to the control piston 5. The control piston 30 is provided with slots $11^a$, recesses $12^a$ and $13^a$ and a central groove $14^a$, similar to the corresponding parts of the control piston 5. The second regulating piston 28 with the rack 27, is provided, like the regulating piston 4, with rings 15ᵃ and 16ᵃ and adjoining annular bridges 22ᵃ and 23ᵃ. Water in the casing 6 passes from the right into the chamber $b'$ of the piston 28, through the opening shown in Fig. 1.

The pistons 5 and 30 are operated by hand from the driver's seat. To that end we provide bell crank levers 34, 35, and 36, 37 mounted on spindles 32 and 33 in the casing 6. The levers 34 and 36 have blocks 38 and 39 respectively fitting into the grooves 14 and 14ᵃ of the control pistons 5 and 30 respectively. The blocks are of such a width that, on the control pistons 5 and 30 being correspondingly moved, they can engage with the bridges 22 and 23, or 22ᵃ and 23ᵃ of the corresponding regulating pistons. The object of this arrangement is to enable the regulating pistons 4 and 28 to be moved in either direction manually even if they should get jammed and fail to yield to the water pressure. Should this happen, say in the position of the control piston 5, shown in Fig. 1, the block 38 will come into engagement with the rib 23 as soon as the piston 5 has been moved to the right to such an extent that the block 38 strikes the rib 23. The two pistons will then be positively coupled together and with the bell crank lever 34, 35 by the block 38. In exactly the same way the second regulating piston 28 can be positively moved by means of the bell crank lever 36, 37.

Let it be assumed that the regulating and the control pistons 4 and 5 are in the relative position shown in Fig. 1. Water passing from the casing 6 through the conduit 8 into the chamber $b$ formed in the regulating piston by the ribs 24 and 25, will partly escape through the spraying holes 9, and partly pass interiorly of the bridge 22, through the recess 12 of the control piston 5, into the chamber $a$ situated to the left of the bridge 22. Any water remaining (from a previous operation) in the right hand chamber $c$ of the spraying head 1, escapes from the chamber $c$ through slots 11 and branch 10 into the open reservoir from which water is supplied to the pipe 7. The pressure in the chamber $a$ on the left of the bridge 22 is greater than that in the chamber $c$ to the right of the bridge 23, since the chamber $c$ at this time is in communication with the outside air, while the chamber $a$ communicates with the chamber $b$ and therefore with the source of water under pressure. In the chamber $b$ the pressures on the right and on the left hand sides are balanced. The result is that the regulating piston 4 will be moved to the right until the bridge 22 is flush with the circumference of the control piston 5, which will stop any further escape of water past the bridge. The water in the chamber $a$ is now cut off from connection with the supply casing 6, that is to say, the water in chamber $a$ is no longer under the same pressure as that in the chamber $b$, on the contrary, there will be the same pressure (atmospheric pressure) in the chambers $a$ and $c$ to the left and right respectively of the regulating piston. The latter will accordingly remain in the position which it occupied at the moment of closing of the chamber $a$. In this position, it is closing a number of the spray holes 9, that is to say it reduces the length of the spray. If it is desired to reduce the length of the spray to a still greater extent, the control piston 5 is again moved to the right until the water can escape again past the bridge 22, and the regulating piston 4 again begins to move. Finally, the regulating piston will strike the cover 3 of the spraying head, closing the chamber $c$, and the control piston 5 will strike against stops 40 provided in the branch of the cover. In this position (or even before reaching it, see Fig. 3), the regulating piston will completely close, by means of its casing situated to the left of the bridge 22, the spraying holes 9. If the regulating piston is now to go back, the control piston 5 must be moved in the opposite direction, that is to say to the left. The bridge 23 of the regulating piston 4 and the recess 13 of the control piston 5 will now coöperate in the same way as the bridge 23 and the recess 12 did before. As soon, for example, as the left hand edge of the recess 13 has passed beyond the left hand edge of the bridge 23, see Fig. 3, water under pressure will flow from the chamber $b$ communicating with the casing 6, into the chamber $c$ closed by the control piston 5 sliding with a watertight fit in the cover 3. At the same time, the slots 11 of the control piston, situated on the left, pass beyond the ring 15 of the regulating piston 4 and allow the water filling the chamber $a$, to escape through the recess of the control piston into the pipe 10. In the chamber $c$ there will therefore be produced a pressure which, in acting on the bridge 23 and the wall 25 of the regulating piston 4, will move it to the left until its bridge 23 closes the recess 13, and its ring 15 the slots 11. Water can no longer escape then from the chamber $a$, water under pressure can no longer pass into the chamber $c$, and the regulting piston will remain stationary. The same action occurs until the regulating piston 4 finally arrives at the left hand end of its travel.

In exactly the same way, the second regulating piston 28 is reciprocated by the control piston 30, in order to turn the regulating piston 19 by means of its rack 27, and thus to alter the width of the spray.

In the construction shown in Figs. 4–7, the second regulating piston which turns the first regulating piston 4, is mounted coaxially with it, and rotatably, in the spraying head 1, and engages with the regulating piston 4 direct, that is to say, without any rack.

The regulating piston 4 and the control piston 5 are made in the same way as in the construction already described, on the control piston being moved to the right or to the left by means of the bell crank lever 41, 42, the regulating piston is shifted lengthwise above the spraying holes 9, and the length of the spray is thus adjusted. Water passes through a breeches pipe 43 into two casings 44 and 45 cast on the spraying head 1. From the casing 44 it reaches the spraying holes 9.

On the right, the spraying head is closed by a cover 46 in the center of which is cast a pipe 47. In the latter is mounted a tubular projection 48 of a rotary valve 49 which works to the right of the cover 46, in a separate chamber. The rotary valve 49 is so connected to the regulating piston 4 that the piston is positively forced to rotate with it, but can move longitudinally independently of it. Any well-known or approved expedient may be employed for this purpose, as for instance, a longitudinal rib on one of these members, sliding in a mating longitudinal groove in the other member. The chamber is closed by a cover 50. The cover is provided with a chamber 51 communicating with the second water supply pipe 45 through a conduit 52, and has an inner tubular projection 53 which adjoins the water outlet pipe 10. The rotary valve 49 has in its interior a second rotary valve 54 which fits tightly into it. The spindle 55 of the said valve 54 passes to the outside through the cover 50 and can be turned by hand by means of a lever 56.

The rotary valve 49 comprises an outer casing 57 (Fig. 6) and two diametrically opposite hollow blades 58 and 59 projecting beyond the casing. From the casing of the spraying head 1 start two diametrically opposite bridges 60 and 61 extending to the casing 57. These bridges and blades 58 and 59 form in the position illustrated four chambers $d\ e\ f\ g$ of equal size.

Within the outer casing 57 the rotary valve 49 has an inner casing 62 in which is mounted the second rotary valve 54. The latter has in cross section the shape of a cross, see Fig. 6. One arm 63 is provided at each end with projections 64, 65 and 66, 67 respectively trough-shaped at both sides, and the other arm 68 has at each end a lug 69 and 70 respectively.

The casings 57 and 62 are connected together by a number of ribs, next to which in one or in both casings are arranged slots. The walls of the blades 58 and 59 are extended inward to the casing 62. Between their ends connecting together the casings in the form of ribs, are arranged in the casing 62 slots 71 and 72. At both sides of the ribs are arranged further slots 73, 74, 75 and 76 in the casing 62, and slots 77, 78, 79 and 80 in the casing 57. Normally to the blades 58 and 59, between the casings 57 and 62, are provided ribs 81$^a$ and 82$^a$, at both sides of which are arranged slots 82, 83, 84 and 85 in the casing 62.

In the illustrated position of the parts, water passes from the casing 45 through the conduit 52 and the chamber 51 of the cover 50, into the blades 58 and 59, from the latter through the slots 71 and 72, troughs 64 and 67, slots 73 and 75 and slots 77 and 79 into the chambers $d$ and $f$. As the latter are closed by the fixed walls 60 and 61, the valve 49 will rotate clockwise owing to the pressure of the water on the blades 58, 59. The water filling the chambers $e$ and $g$ escapes through the slots 80, 85 and 78, 83 into the interior of the rotary valve 54 and thence through the projection 53 into the discharge pipe 10. The rotation of the valve 49 continues until the slots 71 and 72 have passed completely beyond the bridges between the troughs of the valve 54. From that moment no water can escape from the blades 58 and 59. Simultaneously with the closing of the blades, the lugs 69 and 70 cover the slots 83 and 85, so that water in the chambers $e$ and $g$ is held back, and holds the valve 49. The regulating piston 4 coupled to the latter, has now closed a number of spraying holes, and therefore the width of spray is correspondingly reduced. If it is to be reduced still more, the valve 54 is turned again, whereupon the slots 71, 72 etc. are opened again. This can be repeated until the blades 58 and 59 strike the partitions 60, 61. At that moment, the spray holes 9 situated within reach of the regulating piston, are completely closed. In order to open them again, the piston 54 is turned in the opposite direction, so that the slots 71 and 72 are brought into communication with the troughs 65 and 66, and the chambers $e$ and $g$ are filled with water, while water from the chambers $d$ and $f$ escapes through the slots 77 and 79.

Rotation of the valve 49 is transmitted to the regulating piston 4 by a ring 86 mounted on the hub 48 and provided with two or more arms 87 and 88 (Fig. 7) which terminate in teeth 89 and 90 and engage with parallel guides 91 of the regulating piston 4, so that the latter has to take part in the rotation of the valve 49, while being still longitudinally adjustable.

In order to enable the valve 49 to be positively rotated in the event of its jamming or failing to yield to the water pressure, the rotary valve 54 is provided at its front end with teeth 92 which can engage with teeth 93 of the valve 49 if it should get jammed. This insures the possibility of rotating the valve 49 under any circumstances, that is to say, of operating it manually if it fails to respond to the water pressure.

What we claim is:

1. In a regulating device for watering carts, the combination with a regulating valve mounted to move lengthwise and to turn in the spraying head and operated by the water pressure, longitudinal movement of the said valve determining the length of the spray and its rotation determining the width of the spray, of a hand operated control device effecting the longitudinal movement, and of another hand operated device effecting the rotation of the regulating valve.

2. In a regulating device for watering carts, the combination with a regulating valve adjustably mounted in the spraying head and operated by the water pressure, comprising a chamber communicating with the water supply and provided with spray holes, said spraying head containing spaced chambers, one at each side of the first-named chamber, of a control valve adjustably mounted in the regulating valve and, according to its position relatively to the regulating valve, connecting one of the said chambers to a water outlet, and connectiong the other chamber to the central chamber of the regulating piston.

3. In a regulating device for watering carts, the combination with a regulating valve mounted to move lengthwise and to turn in the spraying head and operated by the water pressure, longitudinal movement of the said valve determining the length of the spray and its rotation determining the width of the spray, of a hand operated control device effecting the longitudinal movement, and of another hand operated device effecting the rotation of the regulating valve, a second regulating valve being arranged in a separate casing connected to the spraying head and supplied with water under pressure, said second regulating valve being provided with a hand operated valve, which is so coupled to the first regulating valve that a longitudinal movement of the second regulating valve results in a rotation of the first.

4. In a regulating device for watering carts, the combination with a regulating valve mounted to move lengthwise and to turn in the spraying head and operated by the water pressure, longitudinal movement of the said valve determining the length of the spray and its rotation determining the width of the spray, of a hand operated control device effecting the longitudinal movement, and of another hand operated device effecting the rotation of the regulating valve, a second regulating valve being arranged in a separate casing connected to the spraying head and supplied with water under pressure, said second regulating valve engaging by means of a rack with a toothed rim of the first regulating valve.

5. In a regulating device for watering carts, a regulating valve operated by water pressure and mounted to move lengthwise relatively to the spray head and also to turn relatively thereto, longitudinal movement of said valve determining the length of the spray while its rotation determines the width of the spray, and two independent manually operated devices, one for effecting the longitudinal movement of the regulating valve, and the other for turning it.

6. In a regulating device for watering carts, a regulating valve and a spray head coöperating therewith, said parts being relatively movable both lengthwise and circumferentially to adjust the length and the width of the spray respectively, means for supplying water under pressure with a tendency to produce longitudinal movement as aforesaid, and two independent manually operated devices, one for causing pressure to effect such longitudinal movement, and the other for causing pressure to effect the aforesaid circumferential movement.

In testimony whereof we have signed this specification in the presence of two subscribing witnesses.

GUSTAV SCHLATTER.
GUSTAV SEGIN.

Witnesses:
 FRANK DIMMKE,
 EMIL MEILE.

Copies of this patent may be obtained for five cents each, by addressing the "Commissioner of Patents, Washington, D. C."